United States Patent [19]
Stuhr et al.

[11] Patent Number: 5,479,880
[45] Date of Patent: Jan. 2, 1996

[54] WATER FILTERING OPEN TRAY BIRD FEEDER

[76] Inventors: Darlene K. Stuhr; Donald E. Stuhr, both of Box 57, 411 Southwright, Orfordville, Wis. 53576

[21] Appl. No.: 306,628

[22] Filed: Sep. 15, 1994

[51] Int. Cl.$^6$ .................................................. A01K 39/01
[52] U.S. Cl. ...................... 119/57.8; 119/51.03; 248/156
[58] Field of Search ................. 119/51.03, 52.2, 119/52.3, 57.8, 57.9; 248/156, 530

[56] References Cited

U.S. PATENT DOCUMENTS

| | | | |
|---|---|---|---|
| 2,746,208 | 5/1956 | Lewis | 248/156 |
| 2,990,924 | 7/1961 | Plunkett | 248/530 |
| 3,104,649 | 9/1963 | Slaven | 119/57.9 |
| 3,284,039 | 11/1966 | Brunner | 248/156 |
| 4,659,049 | 4/1987 | Watson | 248/156 |
| 4,896,651 | 1/1990 | Kott, Jr. | 248/156 |
| 4,920,897 | 5/1990 | Reed et al. | 248/156 |
| 5,117,806 | 6/1992 | Soat | 248/156 |
| 5,215,040 | 6/1993 | Lemley | 119/57.9 |

FOREIGN PATENT DOCUMENTS

| | | | |
|---|---|---|---|
| 2140292 | 11/1984 | United Kingdom | 248/530 |
| 2154416 | 9/1985 | United Kingdom | 119/57.9 |

*Primary Examiner*—Todd E. Manahan

[57] ABSTRACT

A feeder for supporting birdseed and permitting rain water to filter through the birdseed. The inventive device includes a support assembly for piercing and engaging a ground surface. A filtering assembly is coupled to an upper distal end of the support assembly and is operable to receive and support birdseed for consumption by a bird. The filtering assembly includes a mesh support screen which permits draining of rain water from the seed.

2 Claims, 4 Drawing Sheets

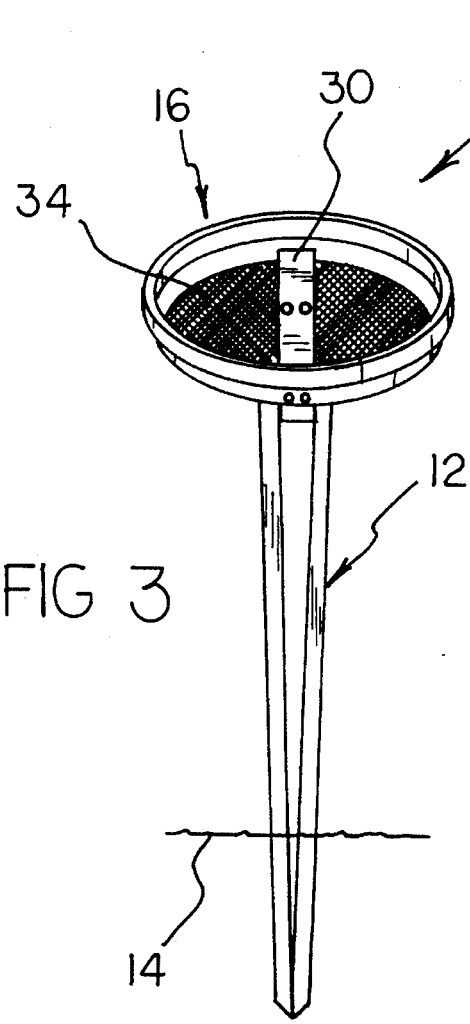
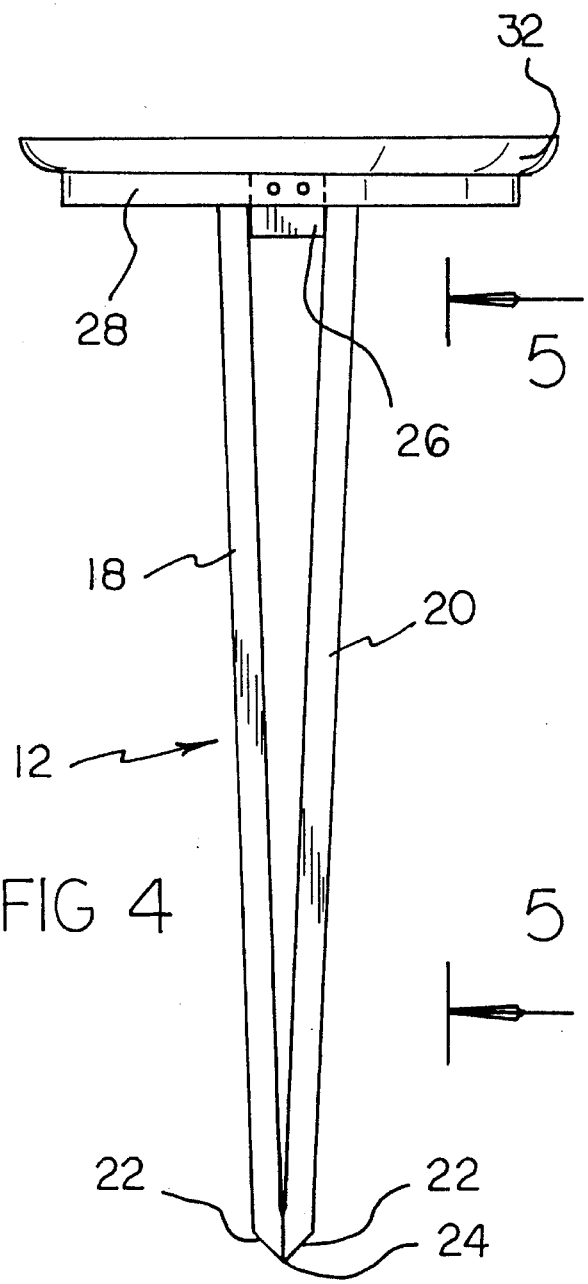

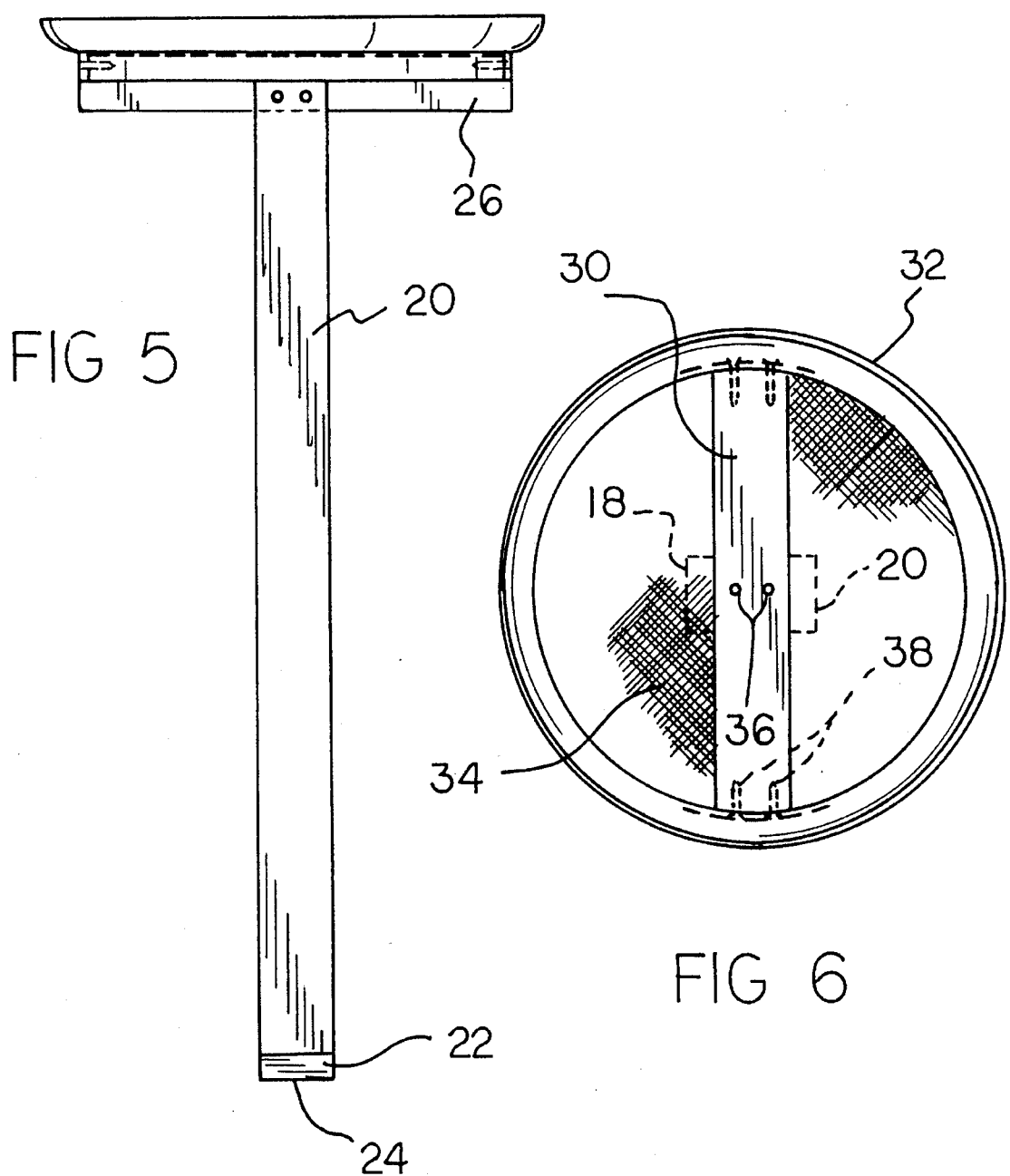

WATER FILTERING OPEN TRAY BIRD FEEDER

BACKGROUND OF THE INVENTION

1. Field of the Invention

The present invention relates to feeding devices and more particularly pertains to a bird feeder for supporting birdseed and permitting rain water to filter through the birdseed.

2. Description of the Prior Art

The use of feeding devices is known in the prior art. More specifically, feeding devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art feeding devices include U.S. Pat. No. 5,207,181; U.S. Pat. No. 5,123,380; U.S. Pat. No. D,330,272; U.S. Pat. No. D,328,655; and U.S. Pat. No. D,288,013.

While these devices fulfill their respective, particular objectives and requirements, the aforementioned patents do not disclose a bird feeder for supporting birdseed and permitting rain water to filter therethrough which includes a support assembly for piercing and engaging a ground surface, and a filtering assembly coupled to an upper distal end of the support assembly for supporting the birdseed for consumption by a bird, wherein the filtering assembly includes a mesh support screen which permits draining of rain water from the seed.

In these respects, the bird feeder according to the present invention substantially departs from the conventional concepts and designs of the prior art, and in so doing provides an apparatus primarily developed for the purpose of supporting birdseed for consumption by bird.

SUMMARY OF THE INVENTION

In view of the foregoing disadvantages inherent in the known types of feeding devices now present in the prior art, the present invention provides a new bird feeder construction wherein the same can be utilized for supporting birdseed and permitting rain water to filter through the birdseed to retain the seed in a dry condition. As such, the general purpose of the present invention, which will be described subsequently in greater detail, is to provide a new bird feeder apparatus and method which has many of the advantages of the feeding devices mentioned heretofore and many novel features that result in a bird feeder which is not anticipated, rendered obvious, suggested, or even implied by any of the prior art feeding devices, either alone or in any combination thereof.

To attain this, the present invention generally comprises a feeder for supporting birdseed and permitting rain water to filter through the birdseed. The inventive device includes a support assembly for piercing and engaging a ground surface. A filtering assembly is coupled to an upper distal end of the support assembly and is operable to receive and support birdseed for consumption by a bird. The filtering assembly includes a mesh support screen which permits draining of rain water from the seed.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new bird feeder apparatus and method which has many of the advantages of the feeding devices mentioned theretofore and many novel features that result in a bird feeder which is not anticipated, rendered obvious, suggested, or even implied by any of the prior art feeding devices, either alone or in any combination thereof.

It is another object of the present invention to provide a new bird feeder which may be easily and efficiently manufactured and marketed.

It is a further object of the present invention to provide a new bird feeder which is of a durable and reliable construction.

An even further object of the present invention is to provide a new bird feeder which is susceptible of a low cost of manufacture with regard to both materials and labor, and which accordingly is then susceptible of low prices of sale to the consuming public, thereby making such bird feeders economically available to the buying public.

Still yet another object of the present invention is to provide a new bird feeder which provides in the apparatuses and methods of the prior art some of the advantages thereof, while simultaneously overcoming some of the disadvantages normally associated therewith.

Still another object of the present invention is to provide a new bird feeder for supporting birdseed and permitting rain water to filter through the birdseed, thereby maintaining the birdseed in a dry condition.

Yet another object of the present invention is to provide a new bird feeder which includes a support assembly for piercing and engaging a ground surface, and a filtering assembly coupled to an upper distal end of the support assembly for supporting the birdseed for consumption by a bird, wherein the filtering assembly includes a mesh screen which permits draining of rain water from the seed.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an isometric illustration of a bird feeder according to the present invention.

FIG. 4 is a front elevation view thereof.

FIG. 5 is a side elevation view taken from line 5—5 of FIG. 4.

FIG. 6 is a top plan view taken from line 6—6 of FIG. 5.

DESCRIPTION OF THE PREFERRED EMBODIMENT

Figure 1:
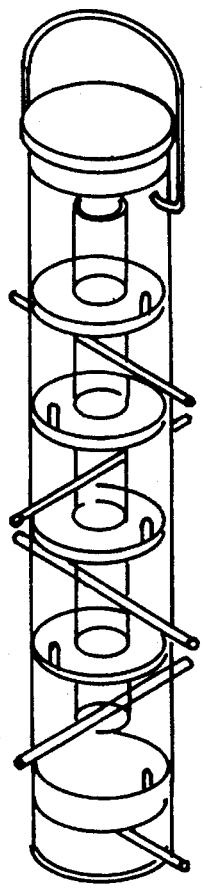
FIG. 1 is an isometric illustration of a prior art feeding device.

With reference now to the drawings, and in particular to FIGS. 3–7 thereof, a new bird feeder embodying the principles and concepts of the present invention and generally designated by the reference numeral 10 will be described.

Figure 2:
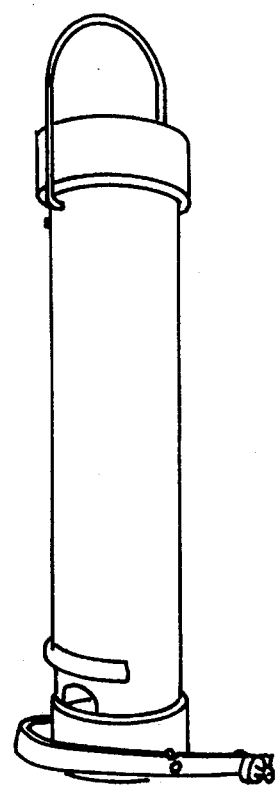
FIG. 2 is a isometric illustration of a further prior art feeding device.
Figure 7:
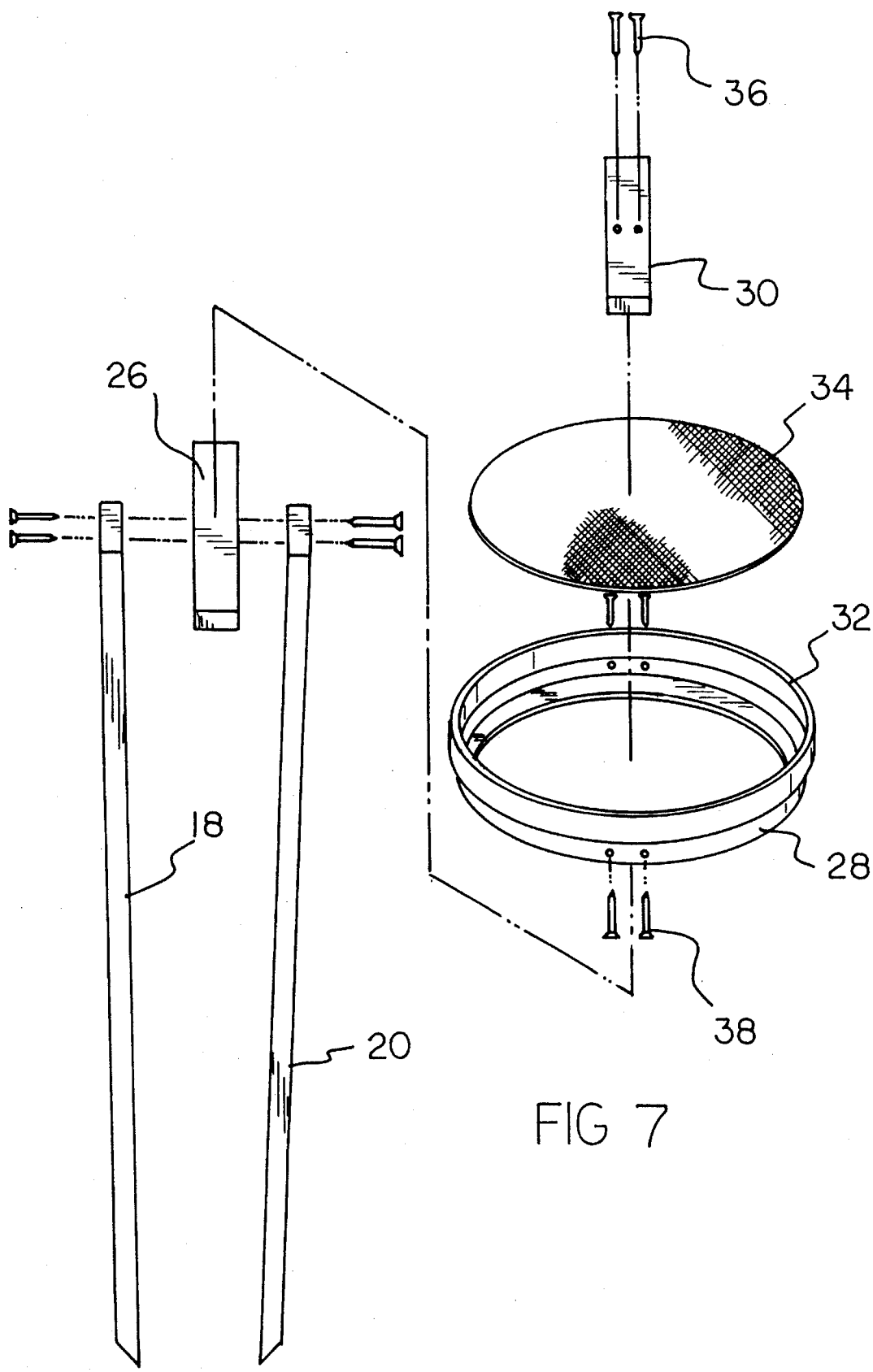
FIG. 7 is an exploded isometric illustration of the present invention.

Turning initially to FIGS. 1 and 2 wherein prior art feeding devices are illustrated, it can be shown that the prior art typically utilizes an elongated cylinder having a closed upper end and at least one side wall aperture extending therethrough, with the closed upper end precluding contact of rain water or the like with the birdseed contained therein.

Turning now to FIGS. 3 through 7, it can be shown that the present invention 10 substantially departs from the designs of the prior art and comprises a support means 12 for piercing and engaging a ground surface 14. A filtering means 16 is mounted to an upper distal end of the support means 12 and is operable to receive and support a mass of birdseed for consumption by wild birds or the like. The filtering means 16 is further operable to permit a filtering of rain water through the birdseed to maintain the seed in a dry condition for consumption by the birds.

As best shown in FIGS. 4 and 5, the support means 12 comprises a first elongated stanchion 18 and a second elongated stanchion 20. The first and second stanchions 18, 20 each include an angled end 22 which cooperate to a form a piercing tip 24 when first ends of the stanchions are positioned and joined in an abutting relationship. The first ends of the first and second stanchions 18, 20 can be joined together by any conventionally known fastening means, such as a use of nails, threaded fasteners, adhesives, bracketry, hinges, or the like. The piercing tip 24 defined by the angled ends 22 of the first and second stanchions 18, 20 is operable to be driven into the ground surface 14, as shown in FIG. 3. The stanchions 18, 20 extend vertically upward from the piercing tip 24 and terminate at second ends thereof. A transverse member 26 extends between the second ends of the stanchion 18, 20 and is similarly joined thereto by any conventionally known fastening means, such as adhesives, threaded fasteners, nails or the like. By this structure, the stanchions 18, 20 may be driven into the ground surface 14, whereby the tapered configuration of the support means 12 provides increasing lateral support to the device 10 relative to a distance the bird feeder is inserted into the ground surface.

As shown in FIGS. 3 and 6, the filtering means 16 preferably comprises a circular frame 28 having a transverse support 30 extending across a center thereof so as to lie substantially coextensive along the transverse member 26. A circumferential perch 32 extends along an upper perimeter of the circular frame 28 and projects upwardly and outwardly therefrom to define an upper distal edge thereof upon which birds or the like can perch through an engagement of the claws of the bird about the upper edge. A mesh support screen 34 is secured across a lower perimeter of the circular frame 28 by a suitable fastening means, such as glue, staples, or the like and is captured between the transverse support 30 and the transverse member 26. A pair of center fasteners 36 extend orthogonally through the transverse support 30 to threadably engage the transverse meter 26 to secure the filtering means 16 to the support means 12. The transverse support 30 is fixedly secured to the interior surface of the circular frame 28 by a plurality of perimeter fasteners 38 extending therethrough which threadably engage the transverse support 30. By this structure, birdseed or the like can be positioned within the filtering means 16, whereby such seed is open and available for consumption by birds or other animals. The mesh support screen 34 permits a draining of rain water from the birdseed, thereby maintaining the birdseed in a dry condition for consumption by the birds.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A bird feeder comprising:

a support means for piercing and engaging a ground surface, said support means comprising a first elongated stanchion and a second elongated stanchion coupled together, said first and second stanchions each including an angled end, said angled ends being positioned and joined together in an abutting relationship and cooperating to a form a piercing tip defined by said angled ends, said first and second stanchions extending vertically upward from said piercing tip and terminating at second ends thereof; and a transverse member extending between and secured to said second ends of said stanchions, said transverse member operating to position said stanchions into a tapered configuration, whereby said tapered configuration of said support means provides increasing lateral support to said bird feeder in response to a distance said support means is inserted into said ground surface;

a filtering means mounted to an upper distal end of said support means for receiving and supporting a mass of birdseed for consumption by an animal, said filtering means being further operable to permit a filtering of rain water through said birdseed to maintain said birdseed in a dry condition, said filtering means comprising a circular frame; a transverse support extending across a center of said circular frame and positioned so as to lie substantially coextensive along said transverse member; a circumferential perch extending along an upper perimeter of said circular frame so as to project upwardly and outwardly therefrom; and a mesh support screen secured across a lower perimeter of said circular frame such that said birdseed can be positioned within said filtering means, with said mesh support screen permitting a draining of rain water from said birdseed, thereby maintaining said birdseed in a dry condition.

2. A bird feeder comprising: a support means for piercing and engaging a ground surface;

a filtering means mounted to an upper distal end of said support means for receiving and supporting a mass of birdseed for consumption by an animal, said filtering means being further operable to permit a filtering of rain water through said birdseed to maintain said birdseed in a dry condition, said filtering means including a frame coupled to the upper distal end of the support means, said frame comprises a circular frame, and further wherein said filtering means further comprises a transverse support extending across a center of said circular frame; a circumferential perch extending along an upper perimeter of said circular frame so as to project upwardly and outwardly therefrom; and a substantially planar mesh support screen secured across a lower perimeter of said frame such that said birdseed can be positioned within said filtering means, with said mesh support screen permitting a draining of rain water from said birdseed, thereby maintaining said birdseed in a dry condition.

\* \* \* \* \*